United States Patent
Guen et al.

(10) Patent No.: US 11,050,115 B2
(45) Date of Patent: Jun. 29, 2021

(54) TRAY FOR ACCOMMODATING SECONDARY BATTERY

(71) Applicant: SAMSUNG SDI CO., LTD., Yongin-si (KR)

(72) Inventors: Minhyung Guen, Yongin-si (KR); Myungpil Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 772 days.

(21) Appl. No.: 14/965,821

(22) Filed: Dec. 10, 2015

(65) Prior Publication Data

US 2016/0336555 A1    Nov. 17, 2016

(30) Foreign Application Priority Data

May 14, 2015   (KR) .................. 10-2015-0067281

(51) Int. Cl.
| | |
|---|---|
| *H01M 2/10* | (2006.01) |
| *H01M 2/34* | (2006.01) |
| *H01M 50/256* | (2021.01) |
| *H01M 50/572* | (2021.01) |

(52) U.S. Cl.
CPC ....... *H01M 50/256* (2021.01); *H01M 50/572* (2021.01); *H01M 2200/00* (2013.01); *H01M 2220/30* (2013.01); *Y02E 60/10* (2013.01)

(58) Field of Classification Search
CPC ........ H01M 2/1005; H01M 2/34; H01M 2/10; H01M 2/1022; H01M 2/1061; H01M 2/345; H01M 2/024; H01M 2/043; H01M 2/305; H01M 2/1066; H01M 10/0525; H01M 10/425; H01M 2200/00; H01M 2220/30; H01M 50/256; H01M 50/572; Y02E 60/10
See application file for complete search history.

(56) References Cited

U.S. PATENT DOCUMENTS

| | | | | |
|---|---|---|---|---|
| 2012/0288740 A1* | 11/2012 | Byun | ................... | H01M 2/021 |
| | | | | 429/96 |
| 2013/0029191 A1* | 1/2013 | Byun | ................... | H01M 2/024 |
| | | | | 429/61 |
| 2013/0171505 A1* | 7/2013 | Chao | .................. | H01M 2/1061 |
| | | | | 429/156 |

(Continued)

FOREIGN PATENT DOCUMENTS

| | | |
|---|---|---|
| JP | 2005-150021 A | 6/2005 |
| KR | 20-0453750 Y1 | 5/2011 |
| KR | 10-2014-0046847 A | 4/2014 |

OTHER PUBLICATIONS

JP 2005-150021 machine translation (Year: 2020).*

(Continued)

*Primary Examiner* — Lingwen R Zeng
(74) *Attorney, Agent, or Firm* — Lewis Roca Rothgerber Christie LLP (57) ABSTRACT

A tray for accommodating a secondary battery is provided, the tray including a plurality of accommodation parts in which secondary batteries are accommodated, wherein each of the accommodation parts includes a bottom portion on which the secondary battery is mounted, sidewalls protruding from the bottom portion and supporting side surfaces of the secondary battery, and a protrusion protruding towards each of the accommodation parts on the sidewalls.

10 Claims, 6 Drawing Sheets

(56) References Cited

U.S. PATENT DOCUMENTS

2014/0044995 A1* 2/2014 Moon ................ H01M 2/1022
429/7
2014/0106202 A1 4/2014 Choi

OTHER PUBLICATIONS

Chinese Office Action, with English translation, dated Nov. 1, 2018, for corresponding Chinese Patent Application No. 201610031727.5 (12 pages).

* cited by examiner

TRAY FOR ACCOMMODATING SECONDARY BATTERY

CROSS-REFERENCE TO RELATED APPLICATION

This application claims priority to and the benefit of Korean Patent Application No. 10-2015-0067281 filed on May 14, 2015 in the Korean Intellectual Property Office, the entire contents of which are herein incorporated by reference.

BACKGROUND

1. Field

The present invention relates to a tray for accommodating a secondary battery.

2. Description of the Related Art

In general, secondary batteries can be discharged and recharged, unlike primary batteries, which are not rechargeable. A low-capacity secondary battery having a single battery cell packaged in the form of a pack is typically used for a small portable electronic device such as a mobile phone or a camcorder. A large-capacity secondary battery, obtained by connecting several tens of battery packs, is widely used as a power supply for driving a motor of a hybrid vehicle or the like.

In transporting the secondary batteries in large quantities, a tray having a space for accommodating a plurality of secondary batteries may be used. It is often the case that the secondary batteries may not be inserted into the tray for accommodating the secondary batteries in a predetermined direction but may be accommodated in a state in which left and right sides or top and bottom sides of each of the secondary batteries are reversed. Therefore, it is helpful for a tray configured to accommodate a secondary battery to be able to prevent the secondary battery from being erroneously accommodated therein.

SUMMARY

Embodiments of the present invention provide a tray for accommodating a secondary battery according to an embodiment of the present invention can prevent the secondary battery from being erroneously inserted by forming a protrusion on a first sidewall contacting a first electrode terminal of the secondary battery.

The above and other aspects of the present invention will be described in or be apparent from the following description of exemplary embodiments.

According to an aspect of the present invention, there is provided a tray for accommodating a secondary battery, the tray including a plurality of accommodation parts in which secondary batteries are accommodated, wherein each of the accommodation parts includes a bottom portion on which the secondary battery is mounted and sidewalls upwardly protruding from the bottom portion and supporting side surfaces of the secondary battery, and a protrusion inwardly protruding to each of the accommodation parts is formed on the sidewalls.

The secondary battery may include an electrode assembly including a first electrode plate, a separator and a second electrode plate; a case accommodating the electrode assembly and having a bottom surface, a pair of long side surfaces and a pair of short side surfaces bent from the bottom surface and upwardly protruding; a cap plate coupled to the case to seal the case and having a short-circuit hole; and a first electrode terminal and a second electrode terminal electrically connected to the electrode assembly and protruding while passing through the cap plate.

The sidewalls may include a first sidewall contacting the first electrode terminal, a second sidewall contacting the second electrode terminal, a third sidewall contacting the pair of short side surfaces of the case, and a fourth sidewall contacting a bottom surface of the case, and the protrusion is formed on the first sidewall.

The protrusion may be positioned in vicinity of the first electrode terminal and may contact the cap plate.

When over-charge occurs to the secondary battery, a short-circuit plate for short-circuiting the second electrode terminal and the cap plate may be formed at the second electrode terminal.

The short-circuit plate may include a first short-circuit plate coupled to the short-circuit hole of the cap plate and downwardly convexly formed and a second short-circuit plate coupled to the second electrode terminal, formed to be spaced apart from the first short-circuit plate and extending to cover the short-circuit hole, and when over-charge occurs to the secondary battery, the first short-circuit plate may contact the second short-circuit plate.

A first separating groove may be formed between the first sidewall and the second sidewall, and a second separating groove may be formed at a location of the fourth sidewall corresponding to the first separating groove.

A support member may be formed under the bottom portion.

A plurality of trays may be vertically stacked and the support member may contact the secondary battery positioned under each of the trays.

Support grooves may be formed on corners of the tray and the support grooves may be formed on at least three of the corners.

As described above, the tray for accommodating a secondary battery according to an embodiment of the present invention can prevent the secondary battery from being erroneously inserted by forming a protrusion on a first sidewall contacting a first electrode terminal of the secondary battery.

In addition, the tray for accommodating a secondary battery according to an embodiment of the present invention includes a support member formed on a bottom surface of an accommodating part of the tray to minimize a gap between each of trays stacked one on another and the secondary battery accommodated therein, thereby preventing the trays from being forcibly pressed down in a tight-fitting manner.

BRIEF DESCRIPTION OF THE DRAWINGS

The above and other features of the present invention will become more apparent by describing in detail exemplary embodiments thereof with reference to the attached drawings in which.

DETAILED DESCRIPTION

Hereinafter, examples of embodiments of the invention will be described in detail with reference to the accompanying drawings such that they can easily be made and used by those skilled in the art.

Figure 1:
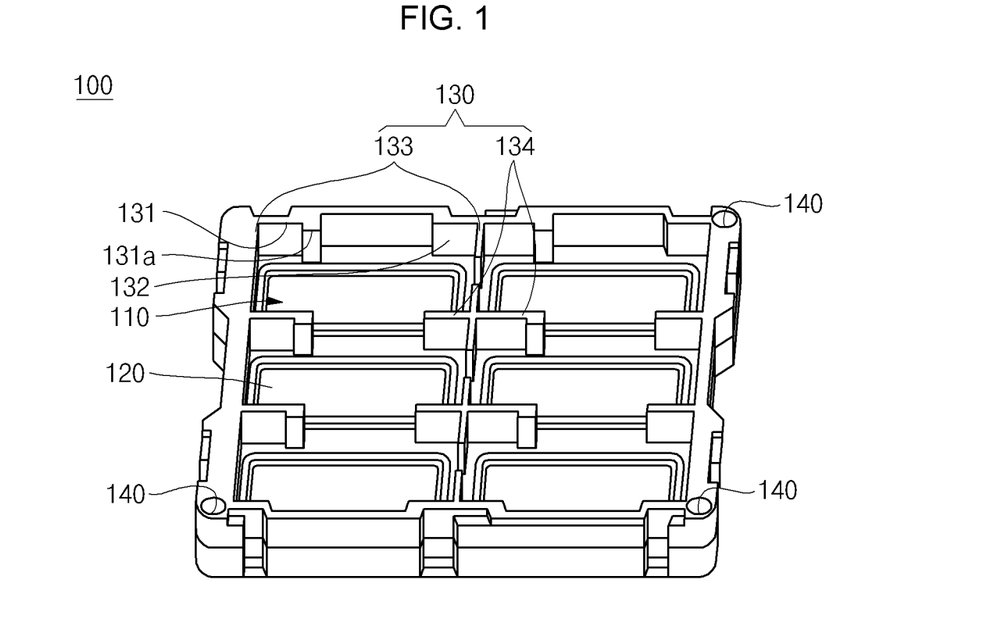
FIG. 1 is a perspective view illustrating a tray for accommodating a secondary battery according to an embodiment of the present invention.
Figure 2:
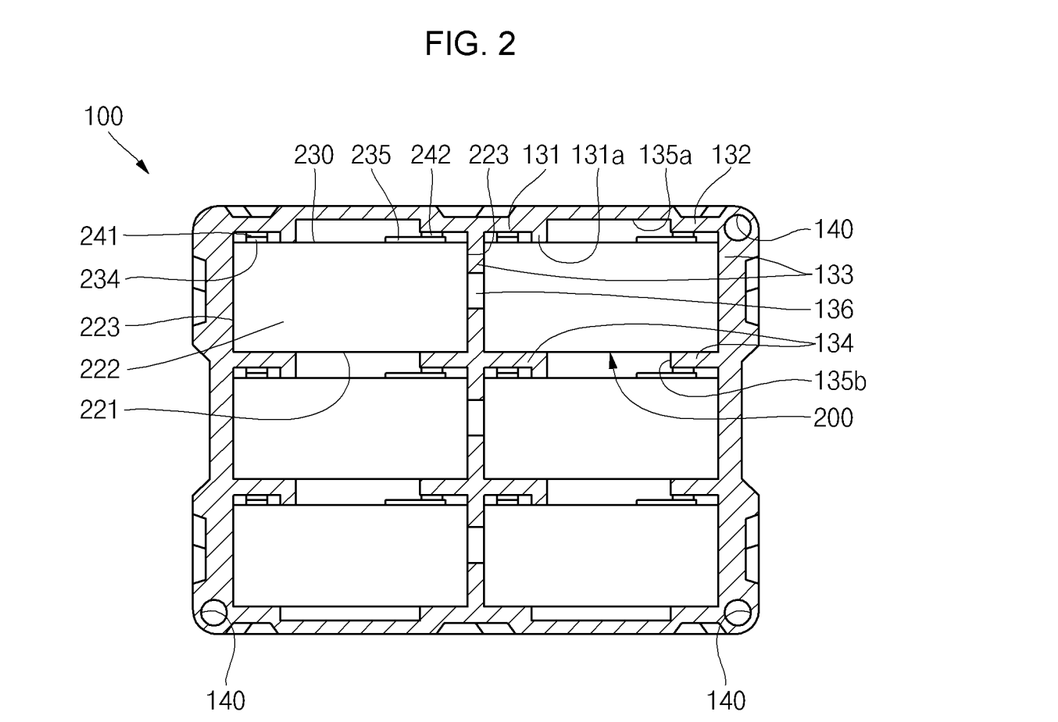
FIG. 2 is a plan view illustrating a state in which a secondary battery according to an embodiment of the present invention is accommodated in the tray illustrated in FIG. 1.
Figure 3:
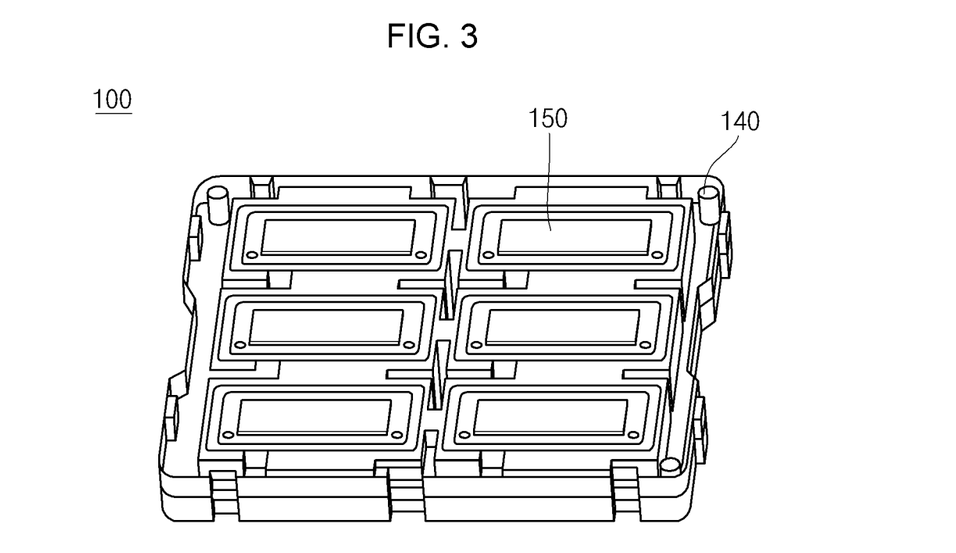
FIG. 3 is a perspective view illustrating a bottom surface of the tray illustrated in FIG. 1.
Figure 4A:
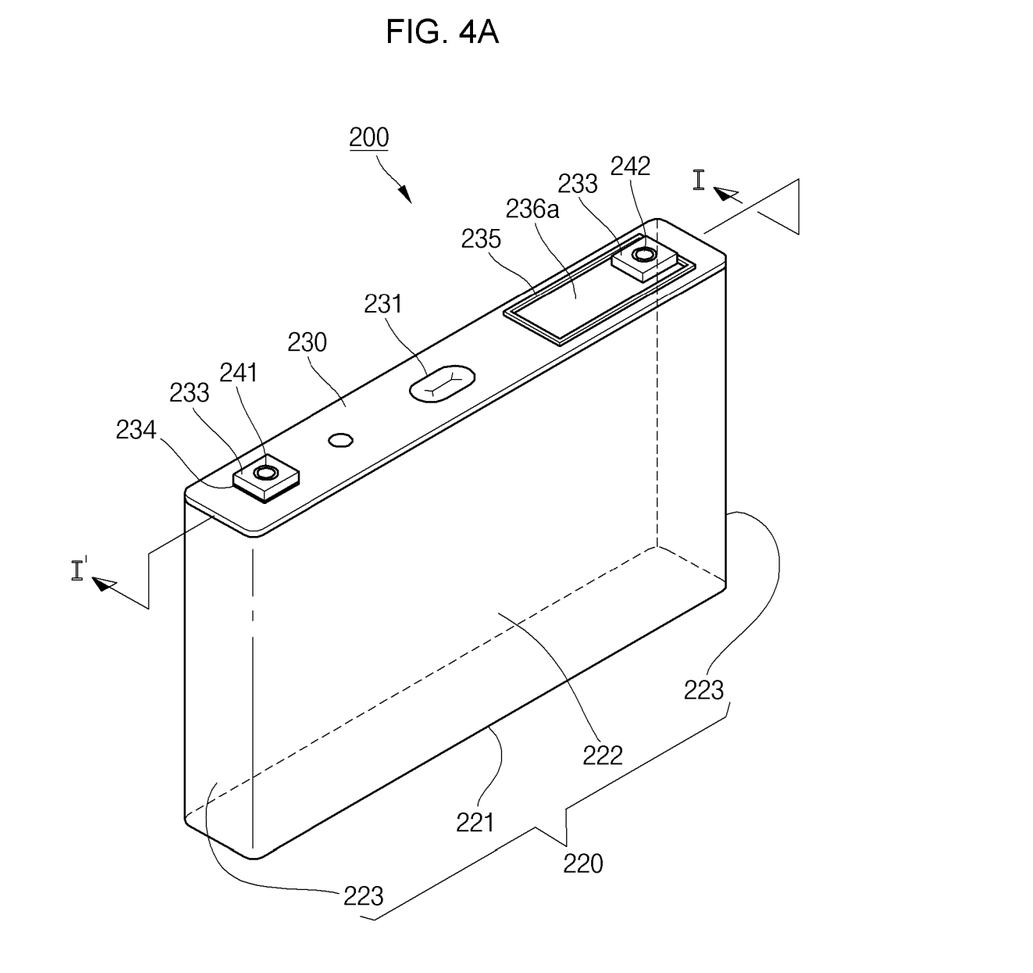
FIG. 4A is a perspective view of the secondary battery illustrated in FIG. 2
Figure 4B:
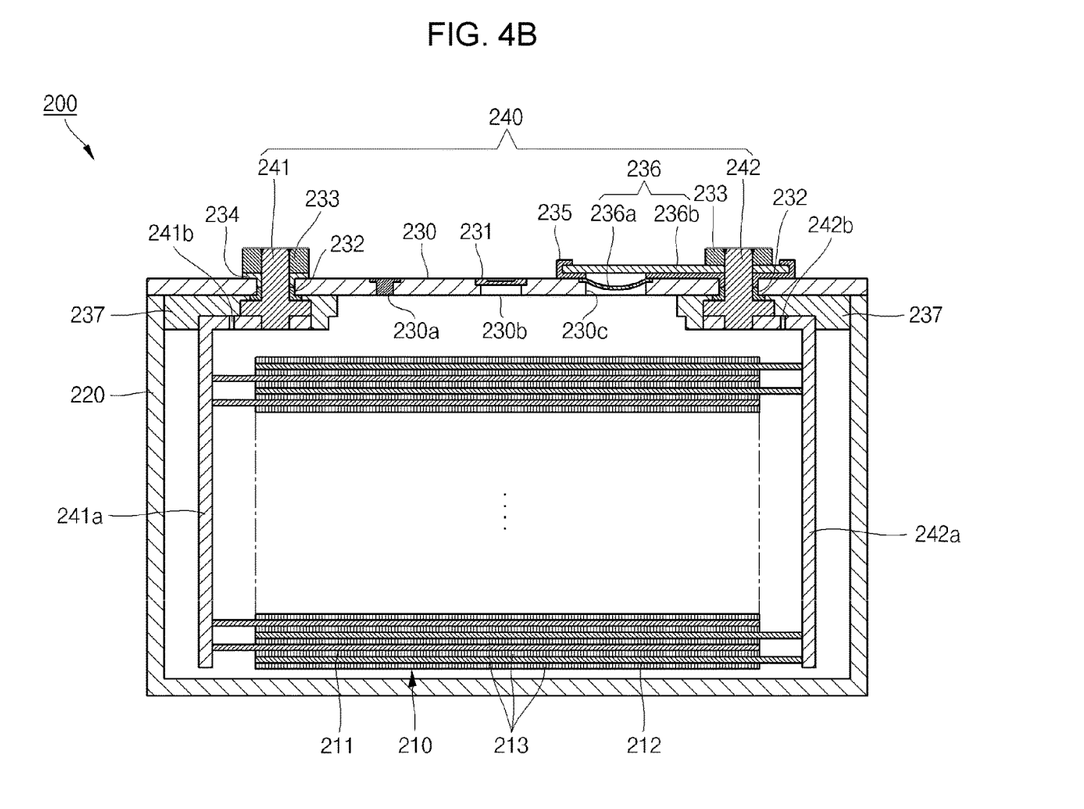
FIG. 4B is a cross-sectional view of the secondary battery taken along the line I-I' of FIG. 4A.
Figure 5A:
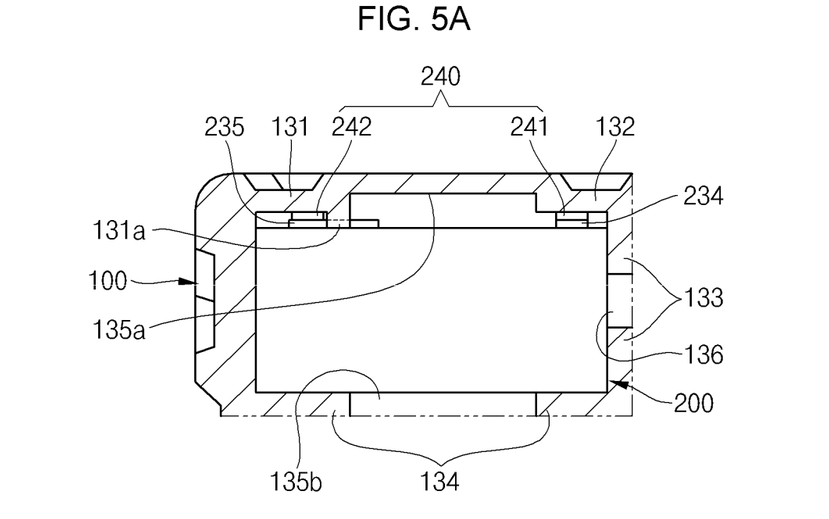
FIGS. 5A to 5C are plan views illustrating examples of secondary batteries each erroneously inserted into a tray for accommodating a secondary battery.
Figure 5B:
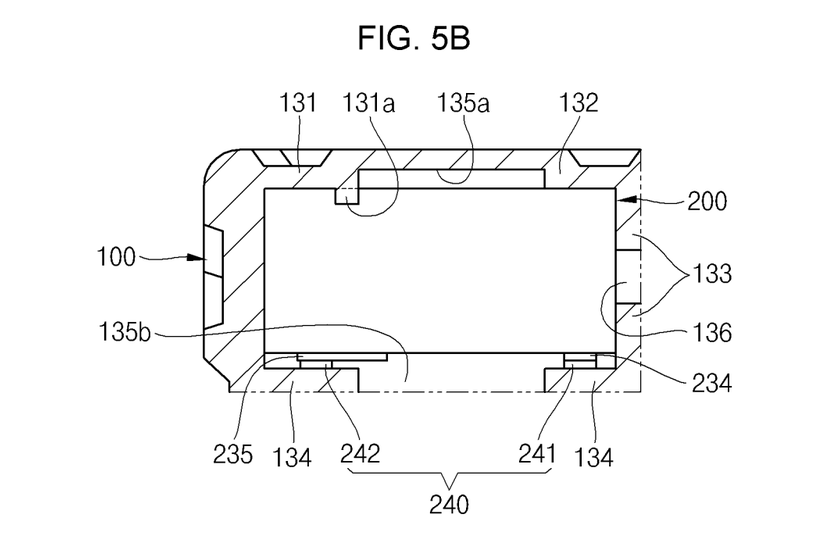
Figure 5C:
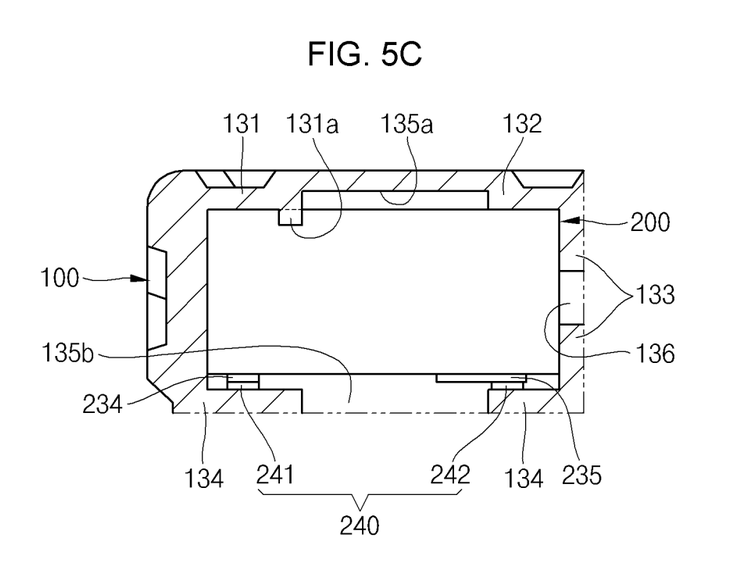
Figure 6:
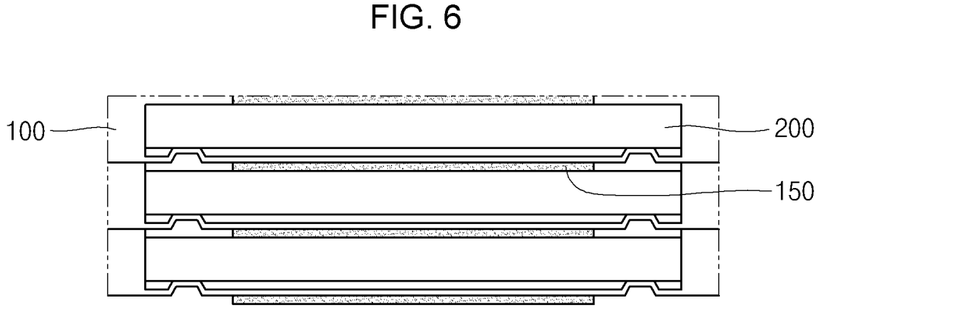
FIG. 6 is a view illustrating stacked trays for accommodating secondary batteries.

FIG. 1 is a perspective view illustrating a tray for accommodating a secondary battery according to an embodiment of the present invention, FIG. 2 is a plan view illustrating a state in which a secondary battery according to an embodiment of the present invention is accommodated in the tray illustrated in FIG. 1, FIG. 3 is a perspective view illustrating a bottom surface of the tray illustrated in FIG. 1, FIG. 4A is a perspective view of the secondary battery illustrated in FIG. 2 and FIG. 4B is a cross-sectional view of the secondary battery taken along the line I-I' of FIG. 4A, FIGS. 5A to 5C are plan views illustrating examples of secondary batteries each erroneously inserted into a tray for accommodating a secondary battery, and FIG. 6 is a view illustrating a state in which trays for accommodating secondary batteries are stacked.

Referring to FIGS. 1 to 3, the tray 100 according to an embodiment of the present invention includes a plurality of accommodation parts 110 for accommodating a plurality of secondary batteries 200. Each of the accommodation parts 110 is formed as a substantially rectangular groove so as to accommodate each of the secondary batteries 200. Each of the accommodation parts 110 includes a bottom portion 120 on which the secondary battery 200 is mounted and sidewalls 130 upwardly protruding from the bottom portion 120 and supporting side surfaces of the secondary battery 200.

In addition, support grooves 140 are formed on corners of the tray 100 and a support member 150 is formed under the bottom portion 120.

First, the secondary battery 200 will now be described with reference to FIGS. 4A and 4B. The secondary battery 200 includes an electrode assembly 210, a case 220 into which the electrode assembly 210 is inserted, a cap plate 230 coupled to the case 220, and an electrode terminal 240 electrically connected to the electrode assembly 210 and protruding while passing through the cap plate 230.

The electrode assembly 210 is formed by stacking or laminating a stacked structure including a first electrode plate 211, a separator 213 and a second electrode plate 212. In one embodiment, the first electrode plate 211 may be a positive electrode plate and the second electrode plate 212 may be a negative electrode plate.

The case 220 is made of a conductive metal such as aluminum, an aluminum alloy or nickel plated steel and has a substantially hexahedral shape having an opening in which the electrode assembly 210 is inserted and placed. The case 220 may have a polarity to function as, for example, a positive electrode. The case 220 has a bottom surface 221 and a pair of long side surfaces 222 and a pair of short side surfaces 223, which are bent from the bottom surface 221 and upwardly protruding. The cap plate 230 is coupled to the opening facing the bottom surface 221. In other words, external surfaces of the substantially rectangular secondary battery 200 are defined by the case 220 and the cap plate 230. The secondary battery 200 is mounted in the tray 100 such that one of the pair of long side surfaces 222 of the case 220 faces the bottom portion 120 of the accommodation part 110. Therefore, the bottom surface 221, the pair of short side surfaces 223 and the electrode terminal 240 protruding from the cap plate 230 comes in contact with the sidewalls 130 of the accommodation part 110.

The cap plate 230 is coupled to the opening of the case 220 to seal the case 220 and may be made of the same material as the case 220. The cap plate 230 includes an electrolyte injection hole 230a through which an electrolyte is injected, a vent hole 230b in which a safety vent 231 is formed, and a short-circuit hole 230c to which a first short-circuit plate 236a is coupled.

The electrode terminal 240 includes a first electrode terminal 241 electrically connected to the first electrode plate 211 and a second electrode terminal 242 electrically connected to the second electrode plate 212. In one embodiment, the first electrode terminal 241 may be a positive electrode and the second electrode terminal 242 may be a negative electrode. The first electrode terminal 241 is electrically connected to the first electrode plate 211 through a first current collector plate 241a and the second electrode terminal 242 is electrically connected to the second electrode plate 212 through a second current collector plate 242a. In one embodiment, fuse parts 241b and 242b are formed in the first current collector plate 241a and the second current collector plate 242a, respectively. When a large amount of current flows due to a short-circuit occurring to the secondary battery 200, regions of the fuse parts 241b and 242b having fuse holes formed therein are melted by heat generated by the large amount of current to then be cut, thereby functioning as fuses for cutting off the flow of current.

In addition, a gasket 232 made of an insulating material is formed between each of the first electrode terminal 241 and the second electrode terminal 242 and the cap plate 230 and seals a portion between each of the first electrode terminal 241 and the second electrode terminal 242 and the cap plate 230. The gasket 232 is coupled to the first electrode terminal 241 and the second electrode terminal 242 under the cap plate 230. In addition, a terminal plate 233 is coupled to each of the first electrode terminal 241 and the second electrode terminal 242 and fixes the first electrode terminal 241 and the second electrode terminal 242 to the cap plate 230.

A connection member 234 is formed between the first electrode terminal 241 and the cap plate 230 and electrically connects the first electrode terminal 241 and the cap plate 230. The connection member 234 is coupled to the first electrode terminal 241 and the cap plate 230. In one embodiment, an upper insulation member 235 is formed between the second electrode terminal 242 and the cap plate 230 and insulates the second electrode terminal 242 from the cap plate 230. In addition, a lower insulation member 237 is formed between each of the first current collector plate 241a and the second current collector plate 242a and the cap plate 230 and insulates each of the first electrode terminal 241 and the second electrode terminal 242 from the cap plate 230.

In addition, a short-circuit plate 236 causing a short-circuit by contacting the cap plate 230 when an internal pressure exceeds a preset pressure due to over-charge occurring to the secondary battery 200 is formed in the second electrode terminal 242. The short-circuit plate 236 includes a first short-circuit plate 236a coupled to the short-circuit hole 230c of the cap plate 230 and a second short-circuit plate 236b coupled to the second electrode terminal 242. In one embodiment, the first short-circuit plate 236a and the second short-circuit plate 236b are separated from each other. The first short-circuit plate 236a is positioned in the short-circuit hole 230c between the upper insulation member 235 and the cap plate 230. The first short-circuit plate 236a may be an inversion plate having a downwardly convex round portion and an edge portion fixed to the cap plate 230. When the internal pressure exceeds a preset pressure due to over-charge occurring to the secondary battery 200, the first short-circuit plate 236a may be inverted to upwardly convexly protrude. The first short-circuit plate 236a has the same polarity as the cap plate 230. The second short-circuit plate 236b is positioned on the upper insulation member 235 and extends to cover the short-circuit hole 230c formed in the cap plate 230. The second short-circuit plate 236b is electrically connected to the second electrode terminal 242. When the internal pressure exceeds a preset pressure, for example, due to over-charge occurring to the secondary battery 200, the second short-circuit plate 236b may come into contact with the upwardly convexly protruding the first short-circuit plate 236a to cause a short-circuit. If the short-circuit is caused, a large amount of current may flow, generating heat. In one embodiment, the fuse parts 241b and 242b may function as fuses, thereby improving safety of the secondary battery 200. As described above, a short-circuit plate 236 for preventing the secondary battery 200 from being over-charged is installed in the second electrode terminal 242 of the secondary battery 200.

The secondary battery 200 including a plurality of secondary batteries is accommodated and mounted in the tray 100. Therefore, the tray 100 includes a plurality of accommodation parts 110. While the tray 100 including 6 accommodation parts 110 is illustrated in FIG. 1, the number of the accommodation parts 110 may be greater or smaller than 6.

Each of the accommodation parts 110 has a bottom portion 120 on which the secondary battery 200 is mounted and sidewalls 130 upwardly protruding from the bottom portion 120 and supporting side surfaces of the secondary battery 200. One of the pair of long side surfaces 222 of the case 220 is brought into contact with the bottom portion 120. In addition, the pair of short side surfaces 223, the bottom surface 221 of the case 220, the first electrode terminal 241 and the second electrode terminal 242 are brought into contact with the sidewalls 130. In detail, the sidewalls 130 include a first sidewall 131 contacting the first electrode terminal 241, a second sidewall 132 contacting the second electrode terminal 242, a third sidewall 133 contacting the pair of short side surfaces 223 of the case 220, and a fourth sidewall 134 contacting the bottom surface 221 of the case 220.

In the secondary battery 200, the first sidewall 131 contacts the first electrode terminal 241 outwardly protruding from the cap plate 230. In addition, a protrusion 131a inwardly protruding to the accommodation part 110 is formed on the first sidewall 131. The protrusion 131a is positioned in vicinity of the first electrode terminal 241 and contacts the cap plate 230. In one embodiment, the protrusion 131a may also be formed to contact the first electrode terminal 241. When the secondary battery 200 is accommodated in the tray 100, the protrusion 131a may prevent the secondary battery 200 from being erroneously inserted into the tray 100. For example, when the secondary battery 200 is horizontally reversed to then be inserted, as illustrated in FIG. 5A (in other words, when the first electrode terminal 241 and the second electrode terminal 242 are transposed and inserted into the tray 100), the protrusion 131a interferes with the short-circuit plate 236 formed in the second electrode terminal 242 so that the secondary battery 200 may not be properly accommodated in the tray 100. In addition, when the secondary battery 200 is vertically reversed to then be inserted, as illustrated in FIGS. 5B and 5C (that is, when the electrode terminal 240 and the bottom surface 221 of the case 220 are transposed and inserted into the tray 100), the protrusion 131a interferes with the short-circuit plate 236 formed in the second electrode terminal 242 so that the secondary battery 200 may not be properly accommodated in the tray 100. As described above, the protrusion 131a may prevent the secondary battery 200 from being erroneously inserted into the tray 100.

The second sidewall 132 is spaced from the first sidewall 131 and contacts second electrode terminal 242 outwardly protruding from the cap plate 230 in the secondary battery 200. In other words, a first separating groove 135a is formed between the first sidewall 131 and the second sidewall 132. The first separating groove 135a may function to easily separate the secondary battery 200 from the accommodation part 110.

The third sidewall 133 contacts the pair of short side surfaces 223 of the case 220. A groove may be formed in the third sidewall 133. In particular, an opening groove 136 may be formed in the third sidewall 133 shared by neighboring accommodation parts 110.

The fourth sidewall 134 contacts the bottom surface 221 of the case 220. A second separating groove 135b may be formed in the fourth sidewall 134. The fourth sidewall 134 may be formed at locations corresponding to the first sidewall 131 and the second sidewall 132 of neighboring accommodation parts 110. In other words, the second separating groove 135b is formed at a location corresponding to the first separating groove 135a. The second separating groove 135b may function to easily separate the secondary battery 200 from the accommodation part 110. In other words, a user is able to easily separate the secondary battery 200 from the tray 100 by inserting fingers into the first separating groove 135a and the second separating groove 135b.

In addition, as illustrated in FIG. 6, the tray 100 may include a plurality of accommodating trays vertically stacked and mounted. The tray 100 has a substantially rectangular shape and support grooves 140 are formed on corners of the tray 100. In one embodiment, the support grooves 140 may be formed on at least three corners of the tray 100. As illustrated in FIG. 3, the support grooves 140 may be formed to protrude from a bottom portion of the tray 100. Therefore, when the plurality of trays are stacked, the support grooves 140 of neighboring trays may be brought into contact with each other, thereby allowing the trays to be evenly stacked one on another.

In addition, the support member 150 is formed on the bottom portion of the tray 100. In detail, the support member 150 is formed on a bottom surface of the bottom portion 120 of the accommodation parts 110. In other words, the support member 150 downwardly protrudes from the tray 100 and minimizes a gap between the tray 100 and the secondary battery 200 stacked under the tray 100. Therefore, the support member 150 may prevent the vertically stacked secondary battery accommodating trays from being forcibly pressed down in a tight-fitting manner due to a weight of the secondary battery 200. In one embodiment, the support member 150 is formed to have the same height as the gap between the tray 100 and the secondary battery 200 mounted under the tray 100.

As described above, the tray 100 according to an embodiment of the present invention includes the protrusion 131a formed on the first sidewall 131 contacting the first electrode terminal 241 of the secondary battery 200, thereby preventing the secondary battery 200 from being erroneously inserted into the tray 100.

While the secondary battery accommodating tray according to the present invention has been particularly shown and described with reference to an exemplary embodiment thereof, it will be understood by those of ordinary skill in the art that various changes in form and details may be made therein without departing from the spirit and scope of the present invention as defined by the following claims.

What is claimed is:

1. A tray for accommodating a secondary battery, the tray including a plurality of accommodation parts in which secondary batteries are accommodated,
    wherein each of the accommodation parts includes a bottom portion on which the secondary battery is mounted, sidewalls protruding from the bottom portion and supporting side surfaces of the secondary battery, and a protrusion on at least one of the sidewalls protruding between a first electrode terminal and a second electrode terminal of the respective secondary battery,
    wherein the second electrode terminal is on an upper insulation member that is wider than the first electrode terminal, and
    wherein the protrusion is closer to the first electrode terminal than to the second electrode terminal such that the secondary battery is prevented from being incorrectly inserted in the tray.

2. The tray of claim 1, wherein the secondary battery comprises:
    an electrode assembly including a first electrode plate, a separator, and a second electrode plate;
    a case accommodating the electrode assembly and having a bottom surface, a pair of long side surfaces and a pair of short side surfaces bent from the bottom surface and extending therefrom;
    a cap plate coupled to the case to seal the case and having a short-circuit hole; and
    the first electrode terminal and the second electrode terminal electrically connected to the electrode assembly and protruding through the cap plate.

3. The tray of claim 2, wherein the sidewalls include a first sidewall contacting the first electrode terminal, a second sidewall contacting the second electrode terminal, a third sidewall contacting the pair of short side surfaces of the case, and a fourth sidewall contacting a bottom surface of the case, and wherein the protrusion is formed on the first sidewall.

4. The tray of claim 2, wherein the protrusion is proximate the first electrode terminal and contacts the cap plate.

5. The tray of claim 2, wherein a short-circuit plate for short-circuiting the second electrode terminal and the cap plate upon over-charging of the secondary battery is formed at the second electrode terminal.

6. The tray of claim 5, wherein the short-circuit plate includes a first short-circuit plate coupled to the short-circuit hole of the cap plate and downwardly convexly formed in a first direction and a second short-circuit plate coupled to the second electrode terminal, spaced from the first short-circuit plate, and extending to cover the short-circuit hole, and wherein the first short-circuit plate is configured to contact the second short-circuit plate upon over-charging of the secondary battery.

7. The tray of claim 3, wherein a first separating groove is formed between the first sidewall and the second sidewall, and a second separating groove is formed at a location of the fourth sidewall corresponding to the first separating groove.

8. The tray of claim 1, wherein a support member is adjacent to the bottom portion.

9. The tray of claim 8, wherein a plurality of trays are vertically stacked and the support member contacts the secondary battery positioned under each of the trays.

10. The tray of claim 1, wherein support grooves are formed on at least three corners of the tray.

* * * * *